United States Patent [19]

Reynolds

[11] 4,397,200

[45] Aug. 9, 1983

[54] SHIFT LEVER HANDLE STRUCTURE AND EQUIPPING METHOD

[76] Inventor: Edward R. Reynolds, 335 N. Adams St., Glendale, Calif. 91206

[21] Appl. No.: 285,167

[22] Filed: Jul. 20, 1981

[51] Int. Cl.³ .............. B60K 20/00; G05G 13/00; B23P 11/00; B23P 19/00

[52] U.S. Cl. ............................. 74/473 R; 29/434; 29/526 R; 74/543

[58] Field of Search .................... 29/526 R, 434; 74/473 R, 471 XY, 473 XY, 473.5 W, 473 P, 543, 548, 504, 511

[56] References Cited

U.S. PATENT DOCUMENTS

| | | | |
|---|---|---|---|
| 2,174,504 | 9/1939 | Cole | 74/473 P |
| 2,860,522 | 11/1958 | Howlett | 74/473 R |
| 3,417,635 | 12/1968 | Day et al. | 74/543 |
| 3,774,468 | 11/1973 | Kimsey | 74/473 R |
| 3,830,192 | 8/1974 | Ronewicz et al. | 74/473 R X |
| 3,911,762 | 10/1975 | Mackal | 74/543 |
| 3,941,009 | 3/1976 | Brown | 74/473 R |
| 4,065,982 | 1/1978 | Wenger | 74/473 R |

*Primary Examiner*—Charlie T. Moon
*Attorney, Agent, or Firm*—Benoit Law Corporation

[57] ABSTRACT

A shift lever handle structure and equipping method operates with a shift lever having on top thereof a shift range selector having pneumatic lines connected thereto. A handle for the shift lever extends above the shift range selector across thereof. This handle is provided with a bent stem having an elongate foot facing away from a midportion of the elongate handle. This elongate foot is oriented parallel to the shift lever and such parallel foot is attached to a side of the shift lever below the shift range selector, with the handle then extending above the shift range selector across thereof, as desired, and the pneumatic lines remaining intact.

10 Claims, 1 Drawing Figure

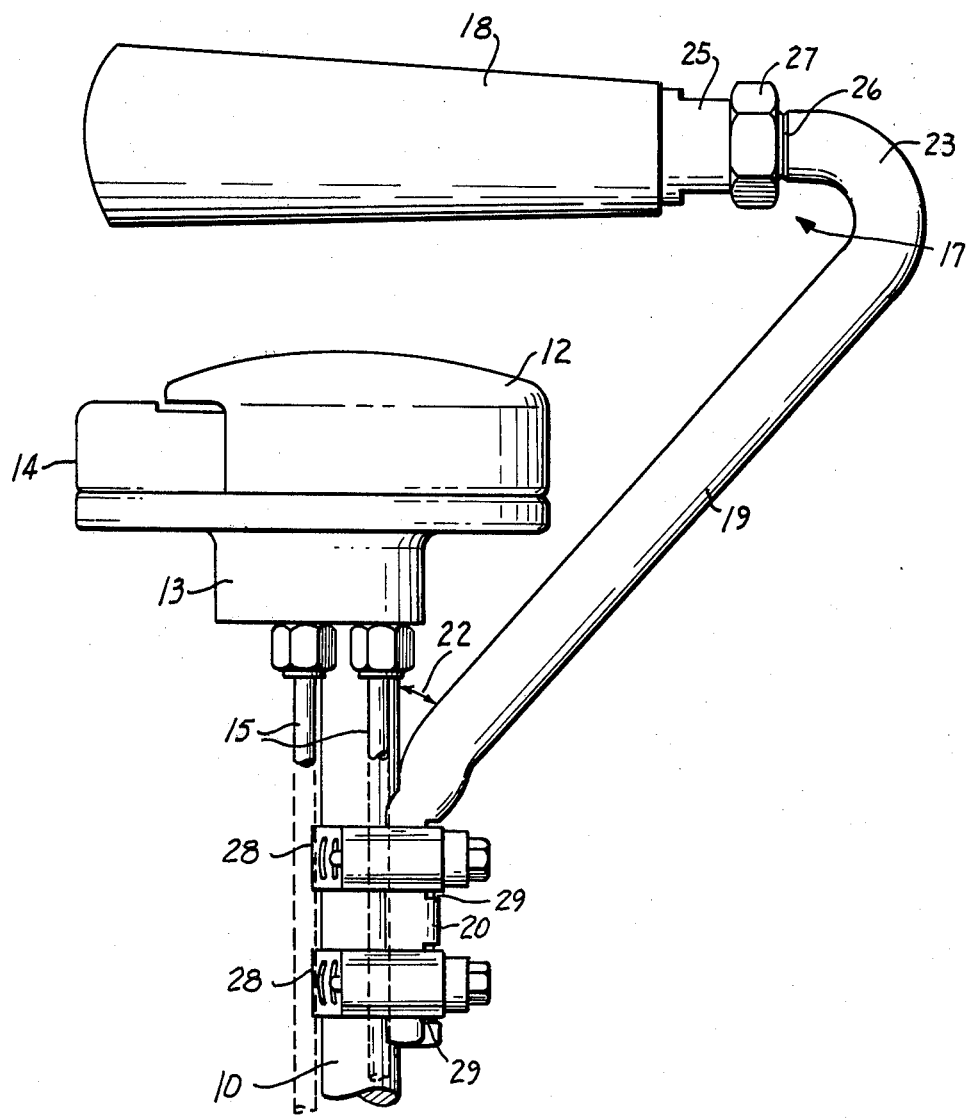

SHIFT LEVER HANDLE STRUCTURE AND EQUIPPING METHOD

BACKGROUND OF THE INVENTION

1. Field of the Invention

The subject invention relates to shift handle structures and equipping methods and, more particularly, to handles adapted to be attached to, or forming part of, a shift lever of a transmission having multiple shift ranges which may be pneumatically selected.

2. Disclosure Statement

This Disclosure Statement is made pursuant to the duty of disclosure imposed by law and formulated in 37 CFR 1.56(a) without any prior art admission on the part of applicant.

Multiple shift range transmissions of the type employed in trucks and other vehicles frequently employ a pneumatic shift range selector sitting on top of a shift lever and having a range selector lever on the periphery thereof.

The shift range selector, sitting on top of the shift lever, is generally intended by its manufacturer as a handle for the shift lever as well. This engenders problems in practice, since the primary function of the shift range selector is, of course, to permit a manual selection among a number of different transmission speed settings which can go as high as a dozen or more settings. This not only dictates a disk-like shape for the shift range selector, but also a choice of materials which tend to get hot, particularly in a road-driven vehicle. It was thus difficult for the driver or operator to get a good, solid grip on the shift lever structure.

Against this background, an improvement was presented by G. S. Brown in his U.S. Pat. No. 3,941,009, issued Mar. 2, 1976, for a shift lever handle, and herewith incorporated by reference herein. A drawback of that proposal was that it required a displacement of the shift range selector at a distance from the top and from the side of the shift lever. This, in turn, necessitated a displacement and sometimes a disturbance of the pneumatic lines or air tubes, which practically have to be pulled out of the floorboard of the truck or similar vehicle. Often, the lines 42 shown in that prior proposal where crimped and ruptured during attempts to install the handle structure 22 and replace the selector 34 as shown in that proposal.

SUMMARY OF THE INVENTION

It is a general object of this invention to overcome the disadvantages and to meet the needs expressed or implicit in the above disclosure statement or in other parts thereof.

It is a germane object of this invention to provide improved methods of equipping a shift lever with a convenient elongate handle.

It is a related object of this invention to provide such an elongate handle without disturbance of an existing shift range selector and, if present, of existing pneumatic speed switching lines.

It is also an object of this invention to provide improved apparatus for shifting gears in a vehicle meeting the above mentioned objects.

It is a related object of this invention to provide improved handle structures for gear shifting levers.

Other objects of this invention will become apparent in the further course of this disclosure.

From a first aspect thereof, the subject invention resides in a method of equipping, with an elongate handle, a shift lever having on top thereof a shift range selector having pneumatic lines connected thereto. The invention according to this aspect comprises, in combination the steps of providing the handle with a bent stem having an elongate foot facing away from a midportion of the elongate handle, orienting the elongate foot parallel to the shift lever, and attaching the parallel foot to a side of the shift lever below the shift range selector, with the handle then extending above the shift range selector across thereof, and the pneumatic lines remaining intact.

From another aspect thereof, the subject invention resides in apparatus for shifting gears in a vehicle comprising, in combination, a shift lever having on top thereof a shift range selector having pneumatic lines connected thereto, a handle extending above and across the shift range selector, a bent stem for the handle having an elongate foot facing away from a midportion of the handle and extending parallel to the shift lever, and means attaching the parallel foot to a side of the shift lever below the shift range selector.

The subject invention also resides in the handle structure itself having the above mentioned bent stem and elongate foot.

BRIEF DESCRIPTION OF THE DRAWING

The subject invention and its various objects and aspects will become more readily apparent from the following detailed description of preferred embodiments thereof, illustrated by way of example in the accompanying drawing, which shows a top portion of apparatus for shifting gears in a vehicle, incorporating a handle structure according to a preferred embodiment of the subject invention.

DESCRIPTION OF PREFERRED EMBODIMENTS

The single drawing shows a shift lever 10 with shift range selector 12 in side view. The shift lever 10 may comprise a metal rod which extends to a multispeed transmission of a truck or similar vehicle (not shown). The shift range selector 12 sits on top of the shift lever 10 and may, for instance, be threaded thereon at a mounting base 13. On the side of a disk or knob-like housing, the shift range selector has a range selector 14 for selecting a plurality of different speed settings via two or more pneumatic lines 15, which typically extend through a floorboard of a vehicle to the transmission thereof.

It is a distinguishing feature of the subject invention that it neither disturbs the position of the shift range selector 12 on top of the shift lever 10, nor the pneumatic lines 15 leading to such shift range selector. Rather, the method of the subject invention leaves the shift range selector 12 on top of the shift lever 10 and also leaves the pneumatic lines 15 intact.

The handle structure 17 according to the subject invention includes a handle 18 extending above the shift range selector 12 across thereof. The invention provides the handle 18 with a bent stem 19 having an elongate foot 20 facing away from a midportion of the elongate handle 10 as, for instance, apparent from the accompanying drawing.

The elongate foot 20 of the handle stem is oriented parallel to the shift lever 10. Such parallel foot, in turn, is attached to a side of the shift lever at a location below the shift range selector 12. The handle 18 then extends above the shift range selector 12 across thereof, and the pneumatic lines 15 remain intact.

In the illustrated preferred embodiment, the elongate foot 20 extends perpendicularly to the handle 18 at a distance thereof. The shift range selector 12 may thus be located inbetween the handle 18 and handle stem foot 20.

The handle stem 19 extends at an acute angle 22 to the shift lever 10, thereby avoiding the shift range selector 12 and its base 13.

At its top, the handle stem 19 may have an acutely bent portion 23 leading to one end of the elongate handle 18.

The handle 18 may have an internally threaded end 25 meshing with an external thread 26 on the bent handle stem end 23. The handle 18 may be secured to the handle stem 19 with the aid of a locking nut 27.

The handle stem 19 may conveniently be attached at its elongate foot to the shift lever 10 by welding, brazing or in any other convenient manner. In retrofitting situations, clamps 28 have been found to be particularly suitable for this purpose. According to the illustrated preferred embodiment, hose clamps 28 are preferably used for attaching the foot 20 to the shift lever 10. The metal bands of the clamps 28 conveniently extend between the shift lever 10 and pneumatic lines 15, without disturbing these lines. Also, the threaded portions of the clamps 28 may in practice conveniently be moved out of the range of the pneumatic lines 15.

One major advantage of the subject invention over other proposals is the high speed with which the handle structure 17 can be installed on the shift lever 10, without time-consuming manipulation of the shift range selector 12 and pneumatic lines 15.

The handle 18 and its stem 19 may conveniently be rotated relative to the shift lever 10 and may also be displaced axially thereto, until the handle 18 is in the most effective and convenient position for the particular driver or operator. The range selecting lever 14 thereby is preferably within reach of the thumb of the operator for a convenient actuation of the shift range control.

If desired, a Velcro band or other cover (not shown) may be employed for the purpose of concealing the clamps 28, as desired.

The handle 18 may be given different configurations, as best adapted to the hands of particular operators.

The subject invention, both in its broad scope and its illustrated preferred embodiment, meets all of its initially stated objectives and provides improved handle structures which ideally combine with traditional shift lever and range selector arrangements, thereby providing for a firm and secure grip on the part of the operator and of a reduction of operator fatigue and other detrimental factors.

Also, the provision of the elongate handle stem foot 20 and attachment means of the type of clamps 28 or equivalents thereof, renders the handle structure according to the subject invention universally adaptable to various shift lever diameters, which was not the case with the above mentioned prior proposal. Also, contrary to that prior proposal, the handle structure according to the subject invention affords broad and as well precise adaptability of the handle position to the special circumstances of any operator's manual anatomy and motoric skills and reflexes. In this respect, the subject invention provides for handle adjustability up and down relative to the selector 12, around an axis through the shift lever 10, and sideways as well.

The handle stem foot 20 may be shaped to hug part of the circumference of the shift lever 10 for a secure attachment. A V-groove (not shown) may be provided for this purpose longitudinally of the foot 20. On the outside, the foot 20 may be coined or depressed in order to provide shallow grooves for receiving the clamp 28 or equivalent attachment devices.

As a further major advantage, the subject invention fully preserves the integrity of the shift range selector 12 and its pneumatic lines 15. In this respect, the above mentioned prior proposal required a partial disassembly of the shift range selector and its removal from the top of the shift lever 10. Up to four pneumatic lines 15 had to be removed and thereafter reinstalled after attachment of the prior handle structure. During such reinstallation, there was a high probability of stripping the thread or otherwise damaging the parts at the interface of the base 13, made typically or aluminum, and the four pneumatic lines 15.

All these disadvantages have been eliminated by the subject invention and its preferred embodiments.

The subject extensive disclosure will suggest or render apparent to those skilled in the art various modifications and variations within the spirit and scope of the disclosed invention and its equivalents.

I claim:

1. A method of equipping, with an elongate handle, a shift lever having on top thereof a shift range selector having pneumatic lines connected thereto, comprising in combination the steps of:
   providing said handle with a bent stem having an elongate foot facing away from a midportion of said elongate handle;
   orienting said elongate foot parallel to said shift lever; and
   attaching said parallel foot to a side of said shift lever below said shift range selector, with said handle then extending above said shift range selector across thereof, and said pneumatic lines remaining intact.

2. A method as claimed in claim 1, including the step of:
   orienting said elongate foot perpendicularly to said handle at a distance therefrom.

3. A method as claimed in claim 1 or 2, including the step of:
   extending said stem at an acute angle to said shift lever above said foot.

4. Apparatus for shifting gears in a vehicle, comprising in combination:
   a shift lever having on top thereof a shift range selector having pneumatic lines connected thereto;
   a handle extending above and across said shift range selector;
   a bent stem for said handle having an elongate foot facing away from a midportion of said handle and extending parallel to said shift lever; and
   means attaching said parallel foot to a side of said shift lever below said shift range selector.

5. Apparatus as claimed in claim 4, wherein:
   said elongate foot extends perpendicularly to said handle at a distance therefrom.

6. Apparatus as claimed in claim 4, or 5, wherein:
   said stem extends at an acute angle to said shift lever.

7. Apparatus as claimed in claim 4 or 5, wherein:

said attaching means include a hose clamp attaaching said foot to said shift lever.

8. In apparatus for shifting gears in a vehicle with a shift lever having a shift range selector on top thereof, the improvement comprising in combination:

a handle extending above and across said shift range selector;

a bent stem for said handle having an elongate foot facing away from a midportion of said handle and adapted to extend parallel to said shift lever; and means attaching said parallel foot to a side of said shift lever below said shift range selector.

9. Apparatus as claimed in claim 8, wherein:
said elongate foot extends perpendicularly to said handle at a distance therefrom.

10. Apparatus as claimed in claim 8 or 9, wherein:
said attaching means include a hose clamp attaching said foot to said shift lever.

* * * * *

UNITED STATES PATENT AND TRADEMARK OFFICE
Certificate

Patent No. 4,397,200            Patented August 9, 1983

Edward R. Reynolds

Application having been made by Edward R. Reynolds the inventor named in the patent above identified, for the issuance of a certificate under the provisions of Title 35, Section 256, of the United States Code, adding the name of William A. Tracy as a joint inventor, and a showing and proof of facts satisfying the requirements of the said section having been submitted, it is this 25th day of Sept., 1984, certified that the name of the said William A. Tracy is hereby added to the said patent as a joint inventor with the said Edward R. Reynolds.

Fred W. Sherling,
*Associate Solicitor.*